United States Patent
Calman et al.

(10) Patent No.: US 9,597,863 B2
(45) Date of Patent: Mar. 21, 2017

(54) ADHESIVE SHEET MATERIAL APPLICATION DEVICE AND METHOD

(71) Applicants: Kenneth J. Calman, Fort Lauderdale, FL (US); Kathryn S. Calman, Fort Lauderdale, FL (US)

(72) Inventors: Kenneth J. Calman, Fort Lauderdale, FL (US); Kathryn S. Calman, Fort Lauderdale, FL (US)

(*) Notice: Subject to any disclaimer, the term of this patent is extended or adjusted under 35 U.S.C. 154(b) by 781 days.

(21) Appl. No.: 13/952,369

(22) Filed: Jul. 26, 2013

(65) Prior Publication Data

US 2014/0027037 A1 Jan. 30, 2014

Related U.S. Application Data

(60) Provisional application No. 61/741,717, filed on Jul. 26, 2012.

(51) Int. Cl.
| | |
|---|---|
| *B32B 37/00* | (2006.01) |
| *B32B 37/10* | (2006.01) |
| *B29C 63/00* | (2006.01) |
| *B29C 63/02* | (2006.01) |

(52) U.S. Cl.
CPC .......... *B32B 37/10* (2013.01); *B29C 63/0004* (2013.01); *B29C 63/0047* (2013.01); *B29C 63/0065* (2013.01); *B29C 63/02* (2013.01); *Y10T 156/10* (2015.01); *Y10T 156/18* (2015.01)

(58) Field of Classification Search
CPC ..... B32B 37/06; B32B 37/10; B29C 63/0004; B29C 63/004; B29C 63/0047
USPC .................. 156/71, 497, 499, 574, 577, 579
See application file for complete search history.

(56) References Cited

U.S. PATENT DOCUMENTS

| | | | | |
|---|---|---|---|---|
| 4,761,201 A | * | 8/1988 | Nichols, Jr. ............. | E04D 15/06 156/497 |
| 4,894,112 A | * | 1/1990 | Lippman ................. | B29C 65/20 156/308.4 |
| 5,683,542 A | * | 11/1997 | Poole .................... | B65H 35/004 156/494 |
| 2011/0308708 A1 | * | 12/2011 | Sternau ................. | E04F 21/165 156/157 |

* cited by examiner

*Primary Examiner* — James Sells
(74) *Attorney, Agent, or Firm* — Ice Miller LLP

(57) ABSTRACT

According to one aspect of the present invention, an adhesive sheet material application device is disclosed, which includes a roller support bar, a handle, and a roller, where the handle and the roller are connected to the roller support bar, a portion of the handle is parallel to the roller, and the roller is rotatable. In another aspect of the present invention, a second handle is connected to the roller support bar and the second handle has a strap. According to another aspect of the present invention, a method of using the adhesive sheet material application device is disclosed, which includes securing a portion of adhesive sheet material to a surface, applying the adhesive sheet material to the surface with the adhesive sheet material application device, and regressing and eradicating bubbles between the adhesive sheet material and surface.

20 Claims, 5 Drawing Sheets

ADHESIVE SHEET MATERIAL APPLICATION DEVICE AND METHOD

RELATED APPLICATION DATA

This application claims priority benefit of U.S. Provisional Application No. 61/741,717 filed Jul. 26, 2012, which is hereby incorporated in its entirety herein by reference.

FIELD OF THE INVENTION

The present invention relates to the application of adhesive sheet materials, and, more particularly, a device and method for applying adhesive sheet materials.

BACKGROUND

Adhesive sheet materials are becoming the increasingly popular choice for advertising or otherwise displaying graphics on signs, automobiles, indoor and outdoor walls, indoor and outdoor floors, indoor and outdoor ceilings, buildings, and numerous other surfaces. Adhesive sheet materials typically have a display side bearing desired graphics, colors, texture, images, and/or text, and an application side that is coated with an adhesive substance and allows for application to various surfaces. The adhesive sheet material is typically applied in oversized sections and then cut or shaped to the desired shape and size. The size of the oversized sections and the size of the surface to which the adhesive sheet material is being applied vary greatly depending on the application.

One type of adhesive sheet material, which is commonly used in the vehicle wrap industry is vinyl paint wraps. Although vinyl paint wraps are common, vehicles can be customized using a variety of adhesive sheet materials and the customization can include, but is not limited to including, body color change and/or texture change.

Adhesive sheet materials are applied to surfaces that have a variety of unique features, such as contours, welded obstacles, edges, texture, and elements such as handles or windows. It is desirable to shape the adhesive sheet material around the surfaces' unique features. The adhesive sheet material is best applied once gently heated during the application process, the heat serving both to activate the adhesive and to render the adhesive sheet material more pliable and thus amenable to compliance with the application to the surface and its unique features. Generally, a heat source, such as a propane or other combustible gas torch is used to heat the adhesive sheet material.

Application of adhesive sheet material is a pressure sensitive process. Applying the wrong amount of pressure can result in improper installation of the adhesive sheet material. Additionally, uniform application of the adhesive sheet material to a surface is difficult because air bubbles commonly get trapped between the adhesive sheet material and the surface. Air bubbles prevent the adhesive sheet material from properly adhering to the surface. If the air bubbles are not eradicated and regressed they can result in aesthetic problems, peeling off of the adhesive sheet material, and/or premature delamination from the adhesive sheet material causing future failure. Air bubbles trapped under a large section of adhesive sheet material can be particularly difficult to eradicate. Additionally, when applying large sections of adhesive sheet material to a surface, it can take a long time and it can be difficult for a user to distribute the correct pressure uniformly over the entire area, in particular on variations in the surface or irregular surface features. Depending on the application environment, application of large sections of adhesive sheet material can be cumbersome, tiring, and sometimes hazardous for the applicator and/or bystanders, frequently requiring the use of several tools and/or people.

Currently, the art lacks a reliable and desirable apparatus and method for flawlessly applying large sections of adhesive sheet material to surfaces, applying the correct pressure, and eradicating and regressing air bubbles trapped between the surface and the adhesive sheet material.

Accordingly, there is a need for a device and a method to facilitate the positioning, affixing, applied pressure, user exertion, and smoothing of the adhesive sheet material to the desired surface.

BRIEF SUMMARY

The present invention fills the need for a device and method that facilitates and addresses the shortcomings of the current devices and methods for applying sections of adhesive sheet material to surfaces and eradicating bubbles trapped between the surface and the adhesive sheet material.

According to one aspect of the present invention, an adhesive sheet material application device is disclosed. The adhesive sheet material application device includes at least one roller support bar. The at least one roller support bar includes at least one roller support member. The adhesive sheet material application device also includes at least one handle. The at least one handle includes at least one handle support member and a gripping portion. The adhesive sheet material application device further includes at least one roller. The at least one roller includes a roller pad. The at least one roller support member extends from the at least one roller support bar. The at least one roller is connected to the at least one roller support member. The at least one handle support member is connected to the at least one roller support bar. A portion of the gripping portion of the at least one handle is parallel to the at least one roller. The roller pad is rotatable. The connected parts of the adhesive sheet material application device can be, but are not limited to being, a single unit, releasably or permanently joined, and/or a contiguous unit.

In at least one embodiment of the present invention, the roller pad is made of an elastic material. In another embodiment of the present invention, the at least one handle includes a handle pad. In yet another embodiment of the present invention, the adhesive sheet material application device includes a second handle. The second handle includes a first end and a second end. The first end connects to the side of the at least one roller support bar and extends away from the at least one roller. In at least one embodiment of the present invention, the at least one roller support member, the at least one handle, and the second handle are made of aluminum. In another embodiment of the present invention, the second handle further includes a handle pad. In another embodiment of the present invention, the adhesive sheet material application device includes a strap. In yet another embodiment of the present invention, the strap connects to the second end of the second handle. In another embodiment of the present invention, the strap is elastic. In at least one embodiment of the present invention, the strap has a smooth surface.

According to another aspect of the present invention, an adhesive sheet material application device is disclosed. The adhesive sheet material application device includes a means for applying even pressure to and regressing bubbles from an adhesive sheet material on a surface. The means for applying even pressure to and regressing bubbles from an adhesive sheet material on a surface includes at least one roller support member, a roller having an elastic roller pad, a first handle, and a second handle. A portion of the first handle is parallel to the roller. In at least one embodiment of the present invention, the adhesive sheet material application device includes a means for securing a portion of a user's arm to the adhesive sheet material application device. In yet another embodiment of the present invention, the means for securing a portion of a user's arm to the adhesive sheet material application device is at least one strap. A portion of a user's arm, can be but is not limited to being, a user's forearm, hand, finger, thumb, wrist, elbow, upper limb, arm, and/or shoulder.

According to another aspect of the present invention, a method of using the adhesive sheet material application device is disclosed. The method of using the adhesive sheet material application device includes securing a portion of adhesive sheet material to a surface and applying the adhesive sheet material to the surface with the adhesive sheet material application device. In at least one embodiment of the present invention, the application of the sheet material includes regressing and eradicating bubbles between the adhesive sheet material and surface. In another embodiment of the present invention, the method of using the adhesive sheet material application device includes pounding of the adhesive sheet material application device against the adhesive sheet material to apply the adhesive sheet material to surfaces features. The surface features, can be but are not limited to being, as contours, welded obstacles, edges, textures, and elements such as rivets, handles, latches, or windows. In another embodiment of the present invention, the method of using the adhesive sheet material application device includes detaching and removing the excess adhesive sheet material from the adhesive sheet material. In at least one embodiment of the present invention, the adhesive sheet material application device is held in a user's first hand and the user's second hand manipulates the adhesive sheet material. In another embodiment of the present invention, the user's first hand holds the first handle of the adhesive sheet material application device and the user's second hand holds the second handle of the adhesive sheet material application device simultaneously. In yet another embodiment of the present invention, method of using the adhesive sheet material application device includes heating the adhesive sheet material using a heat source intermittently while applying the sheet material onto the surface with the adhesive sheet material application device. Intermittent use of the heat source, can be but is not limited to being, patterned, sporadic, constant, concurrent, and/or single use. In another embodiment of the present invention, the adhesive sheet material application device is held in a user's first hand and the heat source is held in a user's second hand.

BRIEF DESCRIPTION OF THE DRAWINGS

The embodiments described herein and other features, advantages, and disclosures contained herein, and the manner of attaining them, will become apparent and the present disclosure will be better understood by reference to the following description of various exemplary embodiments of the present disclosure taken in conjunction with the accompanying drawing, wherein.

Figure 1:
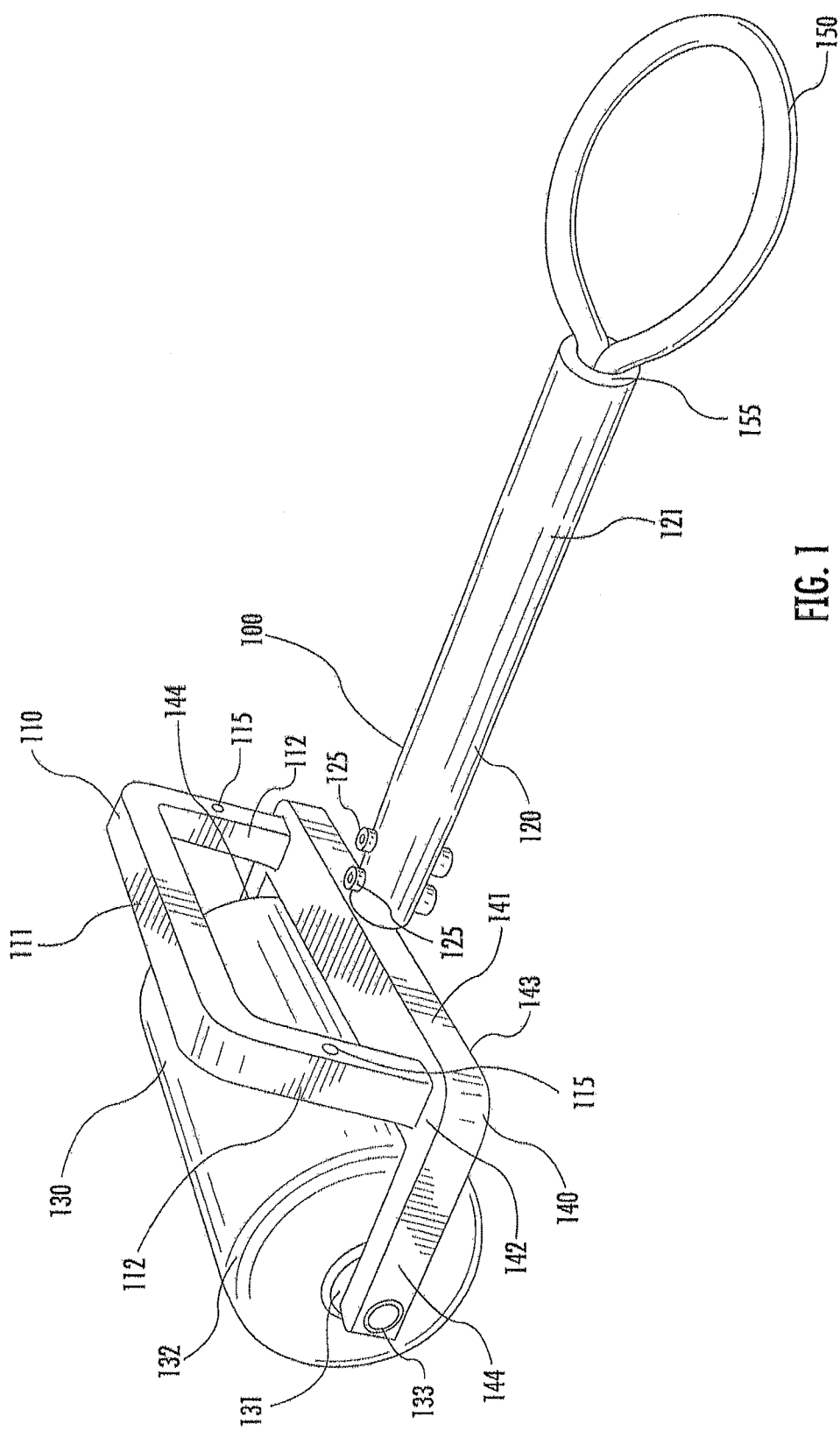
FIG. 1 is a perspective view of an adhesive sheet material application device according to at least one embodiment of the present disclosure.

It should be understood that the appended drawings are not necessarily to scale, presenting a somewhat simplified representation of various preferred features illustrative of the basic principles of the invention. Certain features of the illustrated embodiments have been enlarged or distorted relative to others to facilitate visualization and clear understanding. In particular thin features may be thickened, for example, for clarity or illustration.

DETAILED DESCRIPTION

For the purposes of promoting an understanding of the principles of the present disclosure, reference will be made to the embodiments illustrated in the drawings, and specific language will be used to describe the same. It will nevertheless be understood that no limitation of the scope of this disclosure is thereby intended.

The present application discloses various adhesive sheet material application devices and methods for using the same. FIG. 1 shows a perspective view of an adhesive sheet material application device 100 according to at least one embodiment of the present invention. As shown in FIG. 1, the adhesive sheet material application device 100 has a first handle 110, a second handle 120, a roller 130, a roller support bar 140, and a strap 150. As shown, the roller support bar 140 has an elongated member 141. The elongated member 141 has a top surface 142, a bottom surface 143, and a first and second end. The roller support bar 140 also has two roller support members 144. The roller support members 144 extend perpendicular to the elongated member 141. The roller support members 144 extend from the first and second end of the elongated member 141 forming a U shape. In other embodiments, the roller support members 144 extend from the elongated member 141 at acute or obtuse angles. In one embodiment, there is only one roller support member 144. In yet another embodiment, there is more than two roller support members 144. In yet another embodiment, the roller support bar 140 is made up of only an elongated member 141 and the elongated member 141 can be, but is not limited to being, straight, curved, rounded, flat, and/or oblique. In another embodiment, the roller support bar 140 is made up of only a roller support member 144 and the roller support member 144 can be, but is not limited to being, straight, curved, rounded, flat, and/or oblique. In one embodiment, the roller support members 144 extend approximately two inches from the elongated member 141. In other embodiments, the roller support members 144 extend less than or more than approximately two inches from the elongated member 141. In one embodiment, the roller support bar 140 is approximately eight and a half inches from the first end to the second end. In other embodiments, the roller support bar 140 is less than or greater than approximately eight and a half inches from the first and second end. Further shown in FIG. 1, the first handle 110 has a first handle gripping portion 111 and two first handle support members 112. The first handle gripping portion 111 has a first and second end. The first handle support members 112 extend perpendicular from the first and second end of the first handle gripping portion 111 forming a U shape. In one embodiment the first handle support members 112 extend two inches from the first handle gripping portion 111. In other embodiments, the first handle support members 112 extend less than or more than two inches from the first handle gripping portion 111. In other embodiments, the first handle support members 112 extend from the first handle gripping portion 111 at acute or obtuse angles. In one embodiment, there is only one first handle support member 112. In yet another embodiment, there are more than two first handle support members 112. The first handle gripping portion 111 is thick enough and long enough to allow for comfortable holding of the first handle gripping portion 111 by a user's hand. Further shown in FIG. 1, the second handle 120 has a second handle gripping portion 121 and a first and second end.

In one embodiment, the first handle 110 is attached to the roller support bar 140 using first handle fasteners 115 and the second handle 120 is attached to the roller support bar 140 by second handle fasteners 125. As shown in FIG. 1, the first handle 110 is attached to the top surface 142 of the roller support bar 140, with the first handle support members 112 resting on the top surface 142 and extending perpendicular from the top surface 142 leaving a space for a user's hand to rest in between the first handle gripping portion 111 and the roller 130 and the first handle gripping portion 111 and the top surface 142. One first handle support member 112 is attached near the first end of the elongated member 141 and the second first handle support member 112 is attached near the second end of the elongated member 141. In other embodiments, the number of first handle support members 112 can vary. In other embodiments, the first handle 110 can be attached to the top surface 142 at an acute or an obtuse angle. As shown in FIG. 1, the first end of the second handle 120 is attached to the roller support bar 140 in-between the first and second end of the elongated member 141. The second handle 120 as shown in FIG. 1, extends perpendicular from the side of the roller support bar 140 in the opposite direction of the roller support members 144. In other embodiments, the second handle 120 can be attached to the side of the roller support bar 140 at an acute or an obtuse angle. In one embodiment, the second handle 120 extends approximately eight inches from the roller support bar 140. In other embodiments, the second handle 120 extends less than or more than approximately eight inches from the support bar 140. Further shown in FIG. 1, the strap 150 is fastened to the second end of the second handle 120. The strap 150 is fastened to the second end of the second handle 120 with a strap fastener 155. As shown, the strap 150 is a loop configured such that a user's hand can easily go through the strap 150 and hold the first handle 110, as explained in more detail below. In one embodiment, the strap length is adjustable. In another embodiment, the strap 150 has a smooth surface. In yet another embodiment, there are two or more straps 150. In another embodiment, the strap 150 has fasteners that allow the strap to be releasably secured to the user's arm.

In another embodiment, the first handle 110 is the roller support bar 140. In another embodiment the first handle 110 is the roller support bar 140 and the first handle support members 112 are the roller support members 144. In another embodiment, the roller 130 is connected to the first handle 110. In yet another embodiment, the second handle 120 is connected to the first handle 110.

As shown in FIG. 1, the first handle fasteners 115 are threaded bolts mated with internal threads inside the first handle support members 112. The second handle fasteners 125 are threaded bolts held in place with lock nuts. The strap fastener 155 is a plastic stopple that mates with the second end of the second handle 120 and securely holds the strap 150. In other embodiments, the first handle fasteners 115, the second handle fasteners 125, and the strap fastener 155 can be a variety of fasteners, including but not limited to, bolts, nuts, washers, rivets, screws, nails, welding, magnets, adhesive, snaps, clips, stopples, plugs, ties, and chemical bonds.

Figure 2:
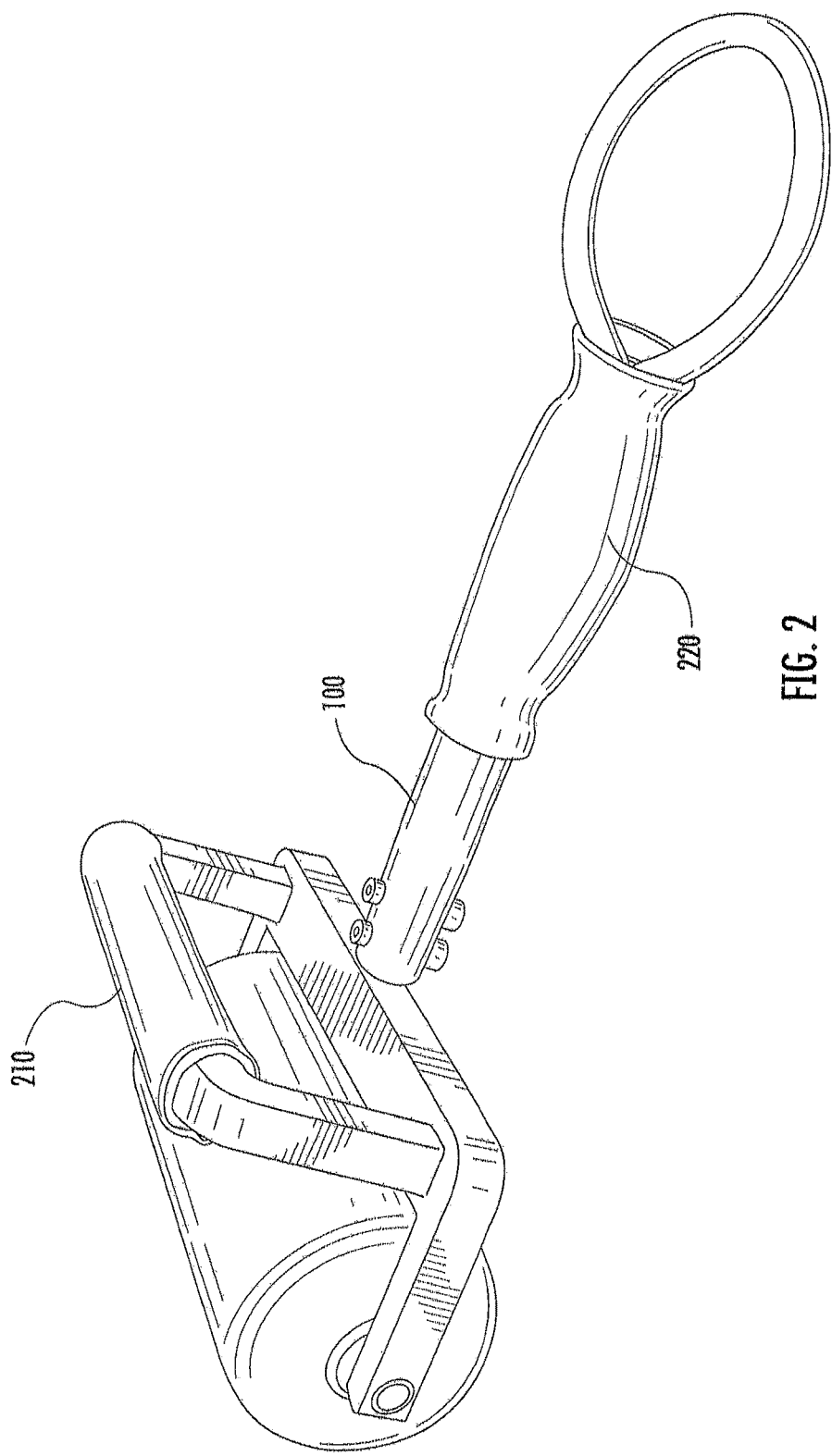
FIG. 2 is a perspective view of an adhesive sheet material application device according to at least one embodiment of the present disclosure.

As shown in FIG. 1, the roller 130 has an axle 131, a roller pad 132, and bearings 133. The roller pad 132 fits snuggly around the axle 131. The bearings 133 mate the ends of the axle 131 to the roller support members 144. The roller 130 is mated to the roller support members 144 so that there is enough room for the roller 130 to rotate freely between the ends of the roller support bar 140. In another embodiment, the roller 130 is mated to the elongated member 141. The bearings 133 allow for rotation of the roller pad 132 and axle 131. In one embodiment, there are no bearings 133. In other embodiments, there are one or more bearings 133. In one embodiment, the roller pad 132 and axle 131 rotate together. In another embodiment, the axle 131 remains stationary and the roller pad 132 rotates around the axle 131. In one embodiment the axle 131 is a portion of the roller support bar 140. The axle 131, can be but is not limited to being, secured at only one end, secured at both ends, and free at both ends. The axle 131 and bearings 133 can be any combination of components that allow the roller to rotate. In one embodiment, the roller pad 132 is approximately seven inches long. In other embodiments, the roller pad 132 is less than or more than approximately seven inches long. In one embodiment, the roller pad 132 is approximately three inches in diameter. In other embodiments, the roller pad 132 is less than or more than three inches in diameter. In one embodiment, the axle 131 is longer than the roller pad 132. In another embodiment, the axle 131 is the same length as the roller pad 132. In one embodiment, the axle 131 is a constant diameter. In another embodiment, the axle 131 varies in diameter. In one embodiment, the axle is sits in holes in both roller support members 144 and is secured so the axle 131 can freely rotate inside the holes. The bearings 133 can be, but are not limited to being, plain bearings, ball bearings, needle bearings, bushings, roll-element bearings, jewel bearings, fluid bearings, magnetic bearings, spring bearings, and flexure bearings. In other embodiments, the number of bearings 133 can be zero or more. In one embodiment, the roller 130 rotates freely. In another embodiment, the roller 130 rotation is limited by friction. In yet another embodiment, the user can adjust the amount of friction preventing or facilitating the rotation of the roller 130. In one embodiment, there is more than one roller 130. In one embodiment, the roller 130 is affixed to the roller support bar 140 using springs. FIG. 2 shows a perspective view of an adhesive sheet material application device 100 according to at least one embodiment of the present invention. As shown in FIG. 2, the first handle 110 has a first handle pad 210 and the second handle 120 has a second handle pad 220. In another embodiment, only the first handle has a first handle pad 210 or only the second handle 120 has a second handle pad 220. The first handle pad 210 and second handle pad 220 can assist the user in gripping and securely holding the adhesive sheet material application device 100. The first handle pad 210 and second handle pad 220 can be, but are not limited to being, ergonomic, removable, and exchangeable. The first handle pad 210 can cover all of the first handle 110 or only a portion of the first handle 110, such as the first handle gripping portion 111. The second handle pad 220 can cover all of the second handle 120 or only a portion of the second handle 120, such as the second handle gripping portion 121. The second handle pad 220 is useful in both the single-hand configuration and double-hand configuration, as explained in more detail below. In the single-hand configuration, the second handle pad 220 can cushion the user's forearm in the strap 150.

The adhesive sheet material application device 100, or components thereof, can be made up of one or more types of materials, including but not limited to, various metals, T-6 aircraft-grade aluminum, various plastics, rubber, silicone, wood, leather, bioplastic, polymers, foam, elastic, various fabrics, and/or micro-fiber materials. The first handle 110, second handle 120, roller support bar 140, and axle 131 arc made up of sturdy, lightweight materials that will withstand and allow the user to apply the force necessary in the application of the adhesive sheet material 320 on the surface 310. The first handle 110, second handle 120, roller support bar 140, and axle 131 can be solid or hollow. The strap 150 is made of a flexible and strong material to allow for ease of donning, offing, and retaining the strap. In one embodiment, the strap 150 is an elastic material. In one embodiment, the strap 150 is a rubber band or rubber tubing. In yet another embodiment, the strap 150 is a less flexible and/or stiff material. The roller pad 132 can be made of, but is not limited to being made of, a cushiony elastic material, the roller pad 132 material quickly returns to its original shape once forces are removed and allows for the force applied by the user to be evenly distributed across the roller pad 132 on the surface 310, even when used on unique or irregular features of surface 310, such as contours, welded obstacles, edges, textures, and elements such as rivets, handles, latches, or windows. The first handle pad 210 and the second handle pad 220 can be made up of, but are not limited to being made up of, stiff, cushiony, flexible, and/or ergonomic elastic materials. In one embodiment, the first handle pad 210 and/or the second handle pad 220 are textured to allow for additional traction when held in a user's hand. The texture can be, but is not limited to being, tacky, ruff, sticky, grainy, coarse, ridged, knobbed, and/or gritty.

In one embodiment, the first handle 110, second handle 120, and roller support bar 140, or some combination of thereof, can be manufactured separately and then fastened together. In another embodiment, the first handle 110, second handle 120, and roller support bar 140 can be manufactured as one single unit. In another embodiment, the first handle 110, second handle 120, and roller support bar 140 can be manufactured as three separate units and then fastened together. In another embodiment, the first handle 110 and roller support bar 140 can be manufactured as one unit and fastened to the second handle 120. In another embodiment, the first handle 110 and second handle 120 can be manufactured as one unit and fastened to the roller support bar 140. In another embodiment, the second handle 120 and the roller support bar 140 can be manufactured as one unit and fastened to the first handle 110. In yet another embodiment, the first handle 110, second handle 120, and roller support bar 140 can be manufactured more than three separate units and then fastened together.

In one embodiment the adhesive sheet material application device 100 cannot be reversibly disassembled into more than a single unit. In another embodiment the adhesive sheet material application device 100 can be easily assembled for use and disassembled for transport, storage, or unconventional uses, such as portions of surface 310 that are partially obstructed from the user's reach.

Figure 3:
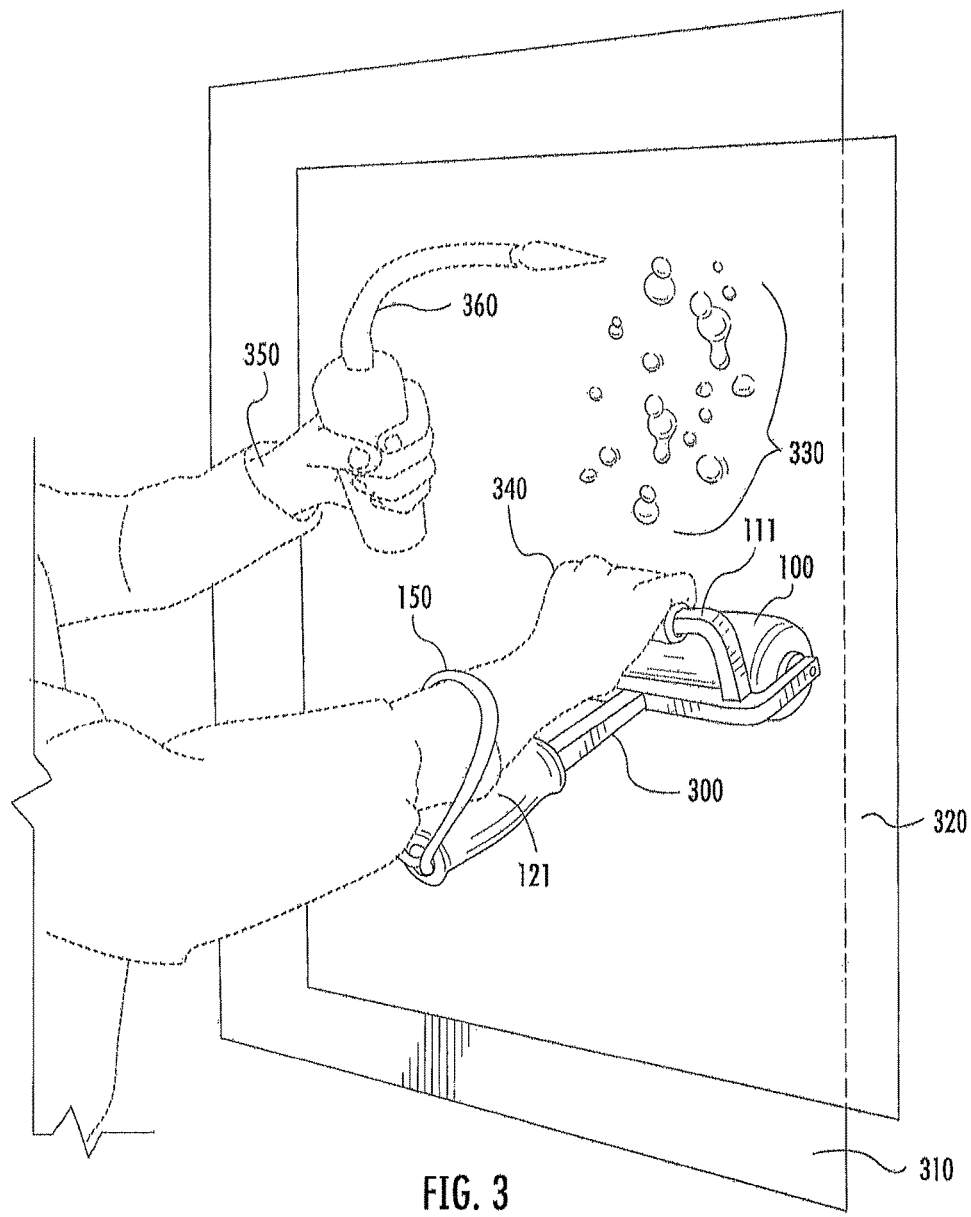
FIG. 3 is a perspective view of an adhesive sheet material application device as used to apply a section of adhesive sheet material to a surface according to at least one embodiment of the present disclosure.

FIG. 3 shows a perspective view of an adhesive sheet material application device 100 in use according to at least one embodiment of the present invention. FIG. 3 shows a large section of adhesive sheet material 320 that has been placed on a surface 310. Also shown in FIG. 3, are air bubbles 330, which arose during the initial application of the adhesive sheet material 320 to the surface 310 and have not yet been regressed by the adhesive sheet material application device 100. The air bubbles 330, can be, but are not limited to being, a variety of bubbles and other bumps or errors that arise when the adhesive sheet material is applied to the surface. FIG. 3 shows the adhesive sheet material application device 100 in use in the single-hand configuration 300. User's first hand 340 is placed through the strap 150 and holds the first handle gripping portion 111 of the first handle 110. In one embodiment, the strap 150 keeps the second handle 120 close to the user's forearm when the user is applying substantial pressure on the roller 130 and keeping the second handle 120 from touching the surface of the pressure-sensitive adhesive sheet material 320 being installed. The strap 150 also stabilizes the adhesive sheet material application device 100, helping it to remain in a constant alignment with the user's forearm and not allowing the second handle 120 to sway disruptively during use. In another embodiment of the single-hand use configuration 300, the user's first hand 340 is placed through the strap 150 and holds the second handle gripping portion 121 of the first handle 120. The single-hand configuration 300 keeps the user's second hand 350 free to manipulate the adhesive sheet material 320 or to utilize other application tools, for instance a heat source 350. As shown in FIG. 3, the user's second hand 350 is holding a heat source 360 to heat the adhesive sheet material 320 to improve the application the of the adhesive sheet material 320. Using a heat source, such as an electric heat gun or a propane or other combustible gas torch, to facilitate in the application of adhesive sheet materials 320 is well known in the art. The user's first hand 340 firmly applies the roller 130 to the adhesive sheet material 320. In this embodiment, the adhesive sheet material application device 100 enables the user efficiently to affix the adhesive sheet material, and to apply adequate pressure and smooth the adhesive sheet material 320 to the surface 310 while regressing and eradicating the air bubbles 330 by rolling the adhesive sheet material application device 100 across the adhesive sheet material 320 on the surface 310.

Figure 4:
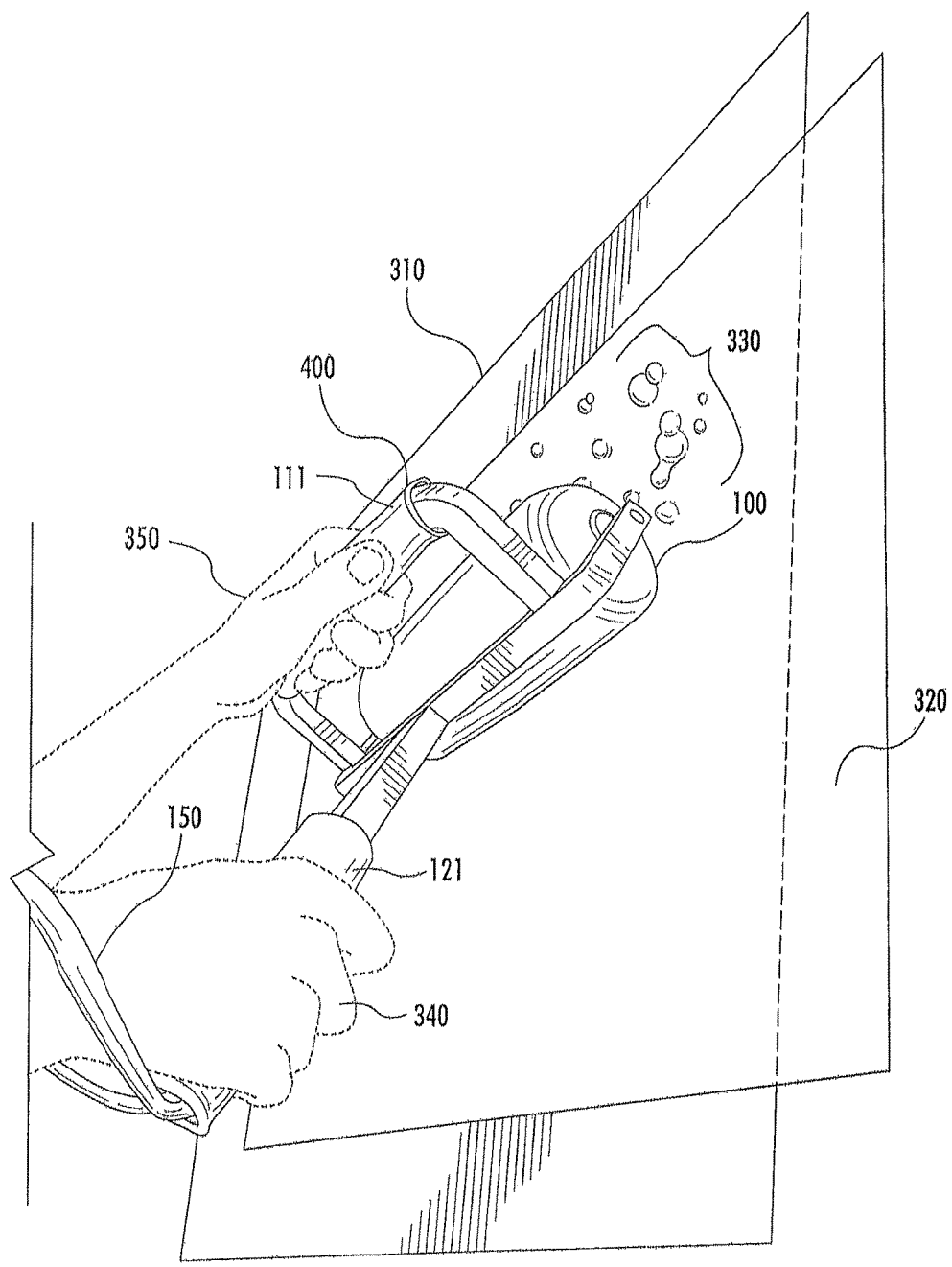
FIG. 4 is a perspective view of an adhesive sheet material application device as used to apply a section of adhesive sheet material to a surface according to at least one embodiment of the present disclosure.

FIG. 4 shows a perspective view of an adhesive sheet material application device 100 in use according to at least one embodiment of the present invention. FIG. 4 shows a large section of adhesive sheet material 320 that has been placed on a surface 310. Also shown in FIG. 4, are air bubbles 330, which arose during the initial application of the adhesive sheet material 320 to the surface 310 and have not yet been regressed by the adhesive sheet material application device 100. FIG. 4 shows the adhesive sheet material application device 100 in use in the double hand configuration 400. User's first hand 340 holds the first handle gripping portion 111 of the first handle 110 while the user's second hand 350 holds the second handle gripping portion 121. In one embodiment, the double hand configuration 400 is used for maximum pressure against the adhesive sheet material 320 and the surface 310, allowing the user to stabilize the roller, apply pressure with both hands, and utilize additional upper body weight to increase the applied pressure. The user's first hand 340 and second hand 350 firmly apply the roller 130 to the adhesive sheet material 320. In this embodiment, the adhesive sheet material application device 100 enables the user efficiently to affix the adhesive sheet material, and to apply adequate pressure and smooth the adhesive sheet material 320 to the surface 310 while regressing and eradicating the air bubbles 330 by rolling the adhesive sheet material application device 100 across the adhesive sheet material 320 on the surface 310. In one embodiment of the double hand configuration 400, the user's first hand 340 is placed through the strap 150 and holds the second handle gripping portion 121 of the second handle 120.

When used with either the single-hand configuration 300 or the double-hand configuration 400 the adhesive sheet material application device 100 allows for adjustable, even pressure from the user across the entire width of the roller 130 with very little effort during application, thus relieving the air for the underside of the adhesive sheet material 320 causing regression of air, which in turn aids the adhesion of the adhesive sheet material 320 to the surface 310.

The adhesive sheet material application device 100 has industry specific mass-marketing appeal due to the vast number of businesses including, but not limited to, graphic designers, sign makers and designers, window tinters, vehicle wrap businesses, vehicle body shops, vehicle paint businesses, automotive bed-liner industries, interior decorators, and paint-protection industries that regularly use adhesive sheet materials. These businesses would benefit from the use of the adhesive sheet material application device 100 on a regular basis as it allows for an easier, more-efficient adhesive sheet material installation process.

Figure 5:
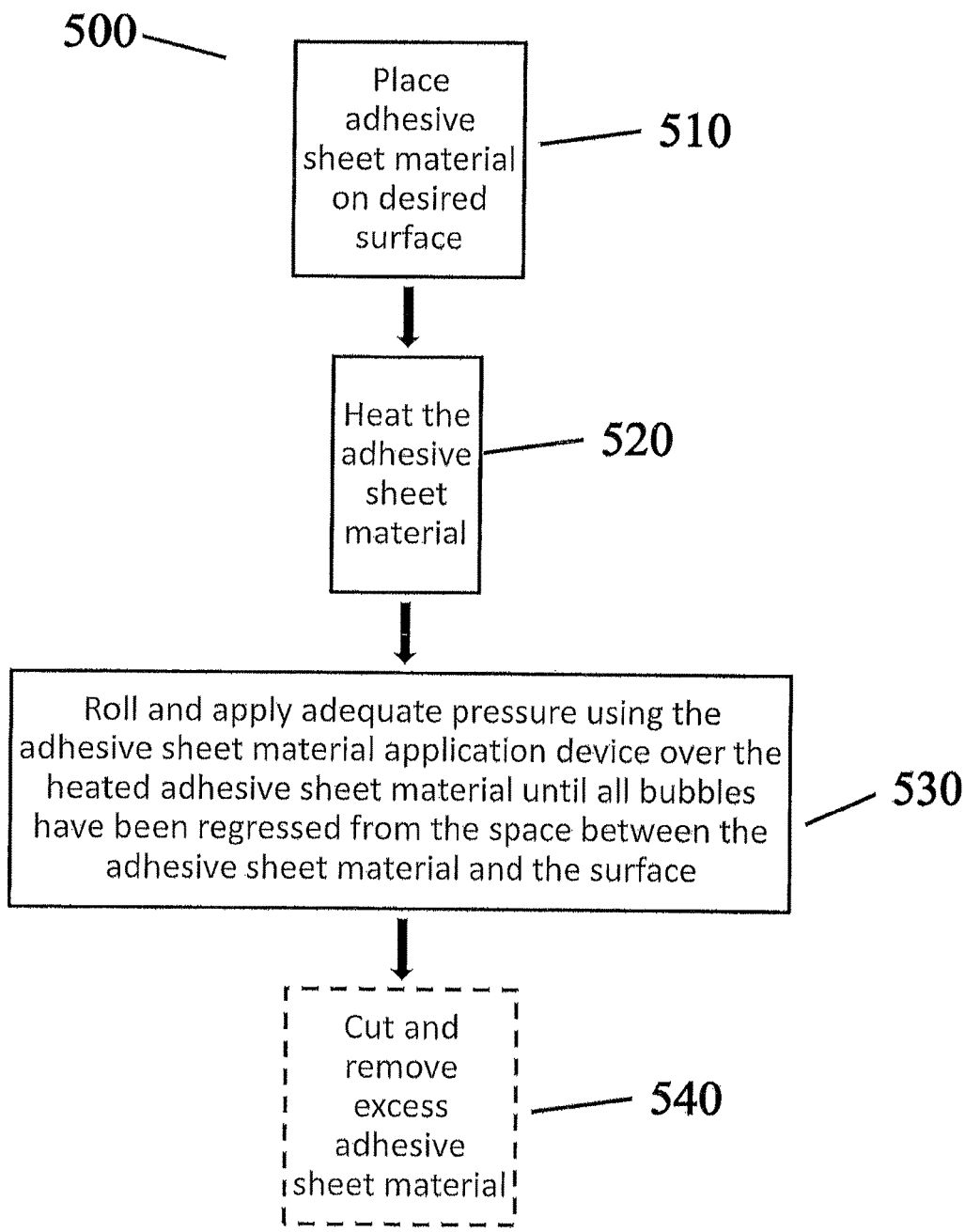
FIG. 5 shows a method of using an adhesive sheet material application device in at least one embodiment of the present disclosure.

FIG. 5 shows a method 500 of using the adhesive sheet material application device 100 according to at least one embodiment of the present disclosure. The method 500 includes the step 510 of placing the oversized adhesive sheet material 320 on a desired surface 310. In one embodiment, the surface is cleaned prior to applying the adhesive sheet material 320. The method 500 also includes the step 520 of heating the adhesive sheet material 320 using a heat source 360, including but not limited to, an electric heat gun or a propane or other combustible gas torch. The method 500 also includes the step 530 of rolling and applying an adequate amount of pressure using the adhesive sheet material application device 100 over the heated adhesive sheet material 320 until all air bubbles 330 have been eradicated or regressed from the space between the adhesive sheet material 320 and the surface 310 and the adhesive sheet material 320 is secured to the surface 310. In one embodiment, a user's first hand 340 holds the adhesive sheet material application device 100 while the user's second hand 350 holds a heat source, which allows a user to alternate application of heat to the adhesive sheet material 320 and rolling of the adhesive sheet material application deice 100. In one embodiment, a user's first hand 340 holds the adhesive sheet material application device 100 while the user's second hand 350 manipulates the adhesive sheet material 320. In another embodiment, the user's first hand 340 and second hand 350 hold, roll, and apply adequate pressure to the adhesive sheet material 320 using the adhesive sheet material application device 100. In another embodiment, when the surface 310 has various unique or irregular features, such as contours, welded obstacles, edges, texture, and/or elements such as handles, rivets, hinges, hardware, or windows, the adhesive sheet material application device 100 can be pounded against the adhesive sheet material 320 over the surface 310 features until the adhesive sheet material 320 is smoothly and securely adhered to the surface 310 features. The method 500 also includes the optional step 540 of cutting and removing the excess adhesive sheet material 320 after the surface 310 has been covered in the desired pattern.

While various embodiments of a filament tape utilization device and methods for using the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

What is claimed is:

1. An adhesive sheet material application device comprising:
    an at least one roller support bar comprising:
        an at least one roller support member;
    an at least one handle comprising:
        an at least one handle support member; and
        a gripping portion; and
    an at least one roller comprising:
        a roller pad;
    wherein:
        the at least one roller support member extends from the at least one roller support bar;
        the at least one roller is connected to the at least one roller support member;
        the at least one handle support member is connected to the at least one roller support bar;
        a portion of the gripping portion of the at least one handle is parallel to the at least one roller; and
        the roller pad is rotatable.

2. The adhesive sheet material application device of claim 1, wherein the roller pad is made of an elastic material.

3. The adhesive sheet material application device of claim 1, wherein the at least one handle further comprises a handle pad.

4. The adhesive sheet material application device of claim 1, further comprising:
    a second handle comprising:
        a first end and a second end;
        wherein the first end connects to the side of the at least one roller support bar and extends away from the at least one roller.

5. The adhesive sheet material application device of claim 4, wherein the at least one roller support member, the at least one handle, and the second handle are made of aluminum.

6. The adhesive sheet material application device of claim 4, wherein the second handle further comprises a handle pad.

7. The adhesive sheet material application device of claim 4, further comprising a strap.

8. The adhesive sheet material application device of claim 7, wherein the strap connects to the second end of the second handle.

9. The adhesive sheet material application device of claim 7, wherein the strap is elastic.

10. The adhesive sheet material application device of claim 7, wherein the strap comprises a smooth surface.

11. An adhesive sheet material application device comprising:
- a means for applying even pressure to and regressing bubbles from an adhesive sheet material on a surface, wherein:
  - the means for applying even pressure to and regressing bubbles from an adhesive sheet material on a surface comprises:
  - an at least one roller support member;
  - a roller, comprising an elastic roller pad;
  - a first handle; and
  - a second handle,
  - wherein a portion of the first handle is parallel to the roller.

12. The adhesive sheet material application device of claim 11, further comprising a means for securing a portion of a user's arm to the adhesive sheet material application device.

13. A method of using the adhesive sheet material application device of claim 1 comprising:
- securing a portion of adhesive sheet material to a surface; and
- applying the adhesive sheet material to the surface with the adhesive sheet material application device.

14. The method of claim 13, wherein the applying of the sheet material includes regressing and eradicating bubbles between the adhesive sheet material and surface.

15. The method of claim 13, further comprising pounding of the adhesive sheet material application device against the adhesive sheet material to apply the adhesive sheet material to surfaces features.

16. The method of claim 13, further comprising:
- detaching and removing the excess adhesive sheet material from the adhesive sheet material.

17. The method of claim 13, wherein the adhesive sheet material application device is held in a user's first hand and the user's second hand manipulates the adhesive sheet material.

18. The method of claim 13, wherein the user's first hand holds the first handle of the adhesive sheet material application device and the user's second hand holds the second handle of the adhesive sheet material application device simultaneously.

19. The method of claim 13, further comprising:
- heating the adhesive sheet material using a heat source intermittently while applying the sheet material onto the surface with the adhesive sheet material application device.

20. The method of claim 19, wherein the adhesive sheet material application device is held in a user's first hand and the heat source is held in a user's second hand.

* * * * *